Oct. 27, 1925.

E. B. MINER

EYEGLASSES OR SPECTACLES

Filed April 6, 1923

1,558,744

WITNESSES

INVENTOR
E. B. Miner
BY
ATTORNEYS

Patented Oct. 27, 1925.

1,558,744

UNITED STATES PATENT OFFICE.

EVERMONT BLEVINS MINER, OF PORTLAND, OREGON.

EYEGLASSES OR SPECTACLES.

Application filed April 6, 1923. Serial No. 630,381.

*To all whom it may concern:*

Be it known that I, EVERMONT BLEVINS MINER, a citizen of the United States, and a resident of Portland, in the county of Multnomah and State of Oregon, have invented certain new and useful Improvements in Eyeglasses or Spectacles, of which the following is a specification.

This invention relates to an improvement in eye glasses and spectacles, and the object of the invention is to provide an improvement of this character which operates to properly position the eye glasses or spectacles and hold them rigid and always at the same angle to the eye.

A further object is to provide an improvement of this character and having these advantages and which is at the same time of simple and light weight construction, and attractive in appearance so as to enhance rather than detract from the appearance of the eye glasses or spectacles.

A still further object is to provide an improvement of this character which operates to carry out its intended functions without causing pain or discomfort to the user and which is equally adapted and capable of use with various types of eye glasses and spectacles.

Other objects and advantages of the invention reside in certain novel features of the construction, combination and arrangement of parts which will be hereinafter more fully described and particularly pointed out in the appended claim, reference being had to the accompanying drawings forming part of this specification, and in which:

Figure 1:
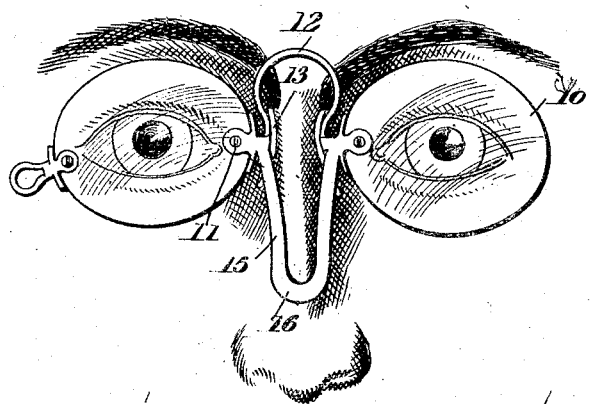
Figure 1 is a view in elevation, showing the invention in use with a "pince-nez" type of eye glass.
Figures 2, 4:
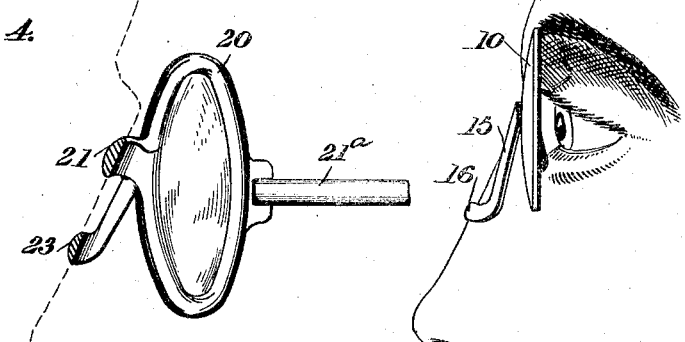
Figure 2 is a view thereof in side elevation.
Figure 4 is a view in section on line 4—4 of Figure 3.

Referring to the drawings and more especially to Figures 1 and 2, the numeral 10 designates the lenses connected by posts 11 to the bridge 12 in the usual manner. Nose guards or grips 13 of conventional form are also provided and are associated with the bridge 12 and post 11 in any approved way. These parts are all of conventional construction and need no detailed explanation. The arrangement thus far described has been embodied in many different forms and is disclosed in many prior patents but all such arrangements have been found deficient in that they fail to hold the glasses rigid and to position the lenses at all times at the same angle to the eye. In order to overcome these disadvantages there is provided a combined positioner and brace 15 which comprises a bar of light metal or any other suitable material secured by solder, welding or by any suitable fastening means to the posts 11 or bridge 12 and extending downwardly from the posts and transversely of the nose from one post to the other.

In the form shown in Figure 1, the combined positioner and brace is of general U-shaped form, the upper ends of its legs being secured to the posts 11 and the bight or body portion of the U being offset outwardly, as at 16, see Figure 2, and being shaped to conform to the contour of the nose. This combined brace and positioner extends downwardly as shown in the drawing and it serves to position the glasses and hold the lenses thereof always at the same angle to the eye but the support of the glasses is of course accomplished by the action of the nose grips 13 which operate in the ordinary manner to accomplish this purpose. As shown in Figure 2 the combined brace and positioner not only extends downwardly but also outwardly but of course the extent to which it is outwardly inclined as well as the distance to which it extends downwardly depends on the particular person being fitted.

Figure 3:
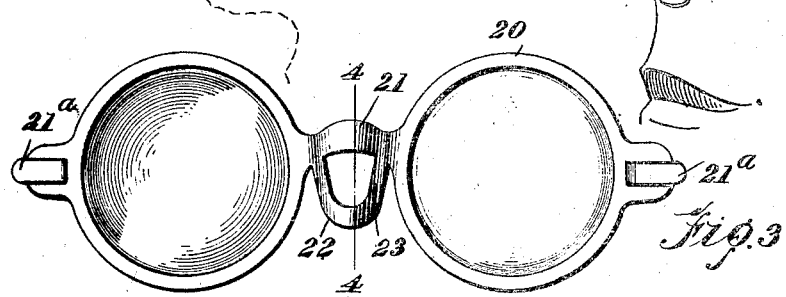
Figure 3 is a view in front elevation, showing the invention embodied in a different type of spectacle.

In Figures 3 and 4 the invention is shown embodied in spectacles of a different type from that shown in Figures 1 and 2. In these figures the lens frame which is of conventional construction is designated at 20, and on each side thereof is equipped with the usual temples or supporting devices 21ª. If desired the lens frame 20 may include as usual the bridge 21 but this is not necessary when the combined brace and positioner, designated at 22, is employed with this type of spectacle as the combined brace and positioner 22 is well adapted to serve also as a bridge. As shown in the drawings the combined brace and positioner 22 is of general U-shape or form and has its body portion 23 offset outwardly and conforming to the contour of the nose, the legs of the U-shaped brace and positioner being designated at 23 and being integrally formed with or suitably connected to the lens frame.

In both embodiments of the invention a transverse bar which constitutes the combined brace and positioner extends below the lens frame or at least below the center line thereof and engages the nose to hold the glasses or lenses rigidly in position and always at the same angle to the eye. This action of the combined brace and positioner is of course not to be confounded with the support of the glasses or spectacles which is accomplished and carried out by the conventional means usually employed for that purpose.

I claim:

In combination with a pair of lenses, posts connected with the lenses, a bridge bar connecting the posts, nose grips carried by the posts and supporting devices for the lenses, a combined brace and positioner including a substantially rigid bar extending from one lens to the other and rigidly and positively connected at its ends with the lens, said bar having a portion intermediate its ends engageable with the nose for holding the lenses rigidly in position and always at the same angle with the eye, said combined brace and positioner being substantially rigid and being rigidly and positively connected with the posts.

EVERMONT BLEVINS MINER.